(12) United States Patent
Nubling

(10) Patent No.: US 9,606,230 B2
(45) Date of Patent: Mar. 28, 2017

(54) OPTOELECTRONIC SENSOR AND METHOD FOR DETECTING OBJECTS IN A MONITORED ZONE

(71) Applicant: SICK AG, Waldkirch (DE)

(72) Inventor: Ulrich Nubling, Waldkirch (DE)

(73) Assignee: SICK AG, Waldkirch (DE)

( * ) Notice: Subject to any disclaimer, the term of this patent is extended or adjusted under 35 U.S.C. 154(b) by 97 days.

(21) Appl. No.: 14/603,793

(22) Filed: Jan. 23, 2015

(65) Prior Publication Data

US 2015/0219763 A1 Aug. 6, 2015

(30) Foreign Application Priority Data

Feb. 4, 2014 (DE) .................. 10 2014 101 312

(51) Int. Cl.

| | |
|---|---|
| *G01B 11/26* | (2006.01) |
| *G01S 17/02* | (2006.01) |
| *G01S 17/42* | (2006.01) |
| *G01V 8/10* | (2006.01) |
| *G01S 7/481* | (2006.01) |

(52) U.S. Cl.
CPC .......... *G01S 17/026* (2013.01); *G01S 7/4813* (2013.01); *G01S 7/4817* (2013.01); *G01S 17/42* (2013.01); *G01V 8/10* (2013.01)

(58) Field of Classification Search
CPC .............................. G01S 7/4817; G01S 7/4813
USPC .......................... 250/206.1, 236; 356/141.4
See application file for complete search history.

(56) References Cited

U.S. PATENT DOCUMENTS

| | | | |
|---|---|---|---|
| 4,319,332 A | 3/1982 | Mehnert | |
| 2012/0242162 A1* | 9/2012 | Hsu | ........................ G01S 7/48 307/104 |

FOREIGN PATENT DOCUMENTS

| | | |
|---|---|---|
| DE | 4222659 A1 | 1/1994 |
| DE | 4340756 A1 | 6/1994 |
| DE | 19757849 A1 | 7/1999 |
| DE | 10114362 A1 | 10/2002 |
| DE | 102004014041 A1 | 10/2005 |
| DE | 102004033928 A1 | 2/2006 |
| DE | 102009035984 A1 | 2/2011 |
| DE | 102011011875 B3 | 7/2012 |

(Continued)

OTHER PUBLICATIONS

German Office Action dated Sep. 22, 2014 corresponding to application No. 102014101312.3.

*Primary Examiner* — Thanh Luu
(74) *Attorney, Agent, or Firm* — Nath, Goldberg & Meyer; Jerald L. Meyer

(57) ABSTRACT

An optoelectronic sensor (10) is provided for detecting objects in a monitored zone (18), in particular a laser scanner, which has a light transmitter (20) for transmitting a transmitted light beam (24), a base unit (14) and a sampling unit (12) rotatable with respect to the base unit (18) for the periodic sampling of the monitored zone (12) by the transmitted light beam (14) and having a first circuit board (34), a light receiver (32) for generating a received signal from the light (28) remitted by objects in the monitored zone (18) and an evaluation unit (34, 42, 50, 52) for detecting information on objects in the monitored zone (18) with reference to the received signal. In this respect, the base unit (14) has a bearing (40) in which the first circuit board (34) is rotatably supported at its outer periphery with respect to the base unit (14).

9 Claims, 2 Drawing Sheets

(56) References Cited

FOREIGN PATENT DOCUMENTS

Figure 1:
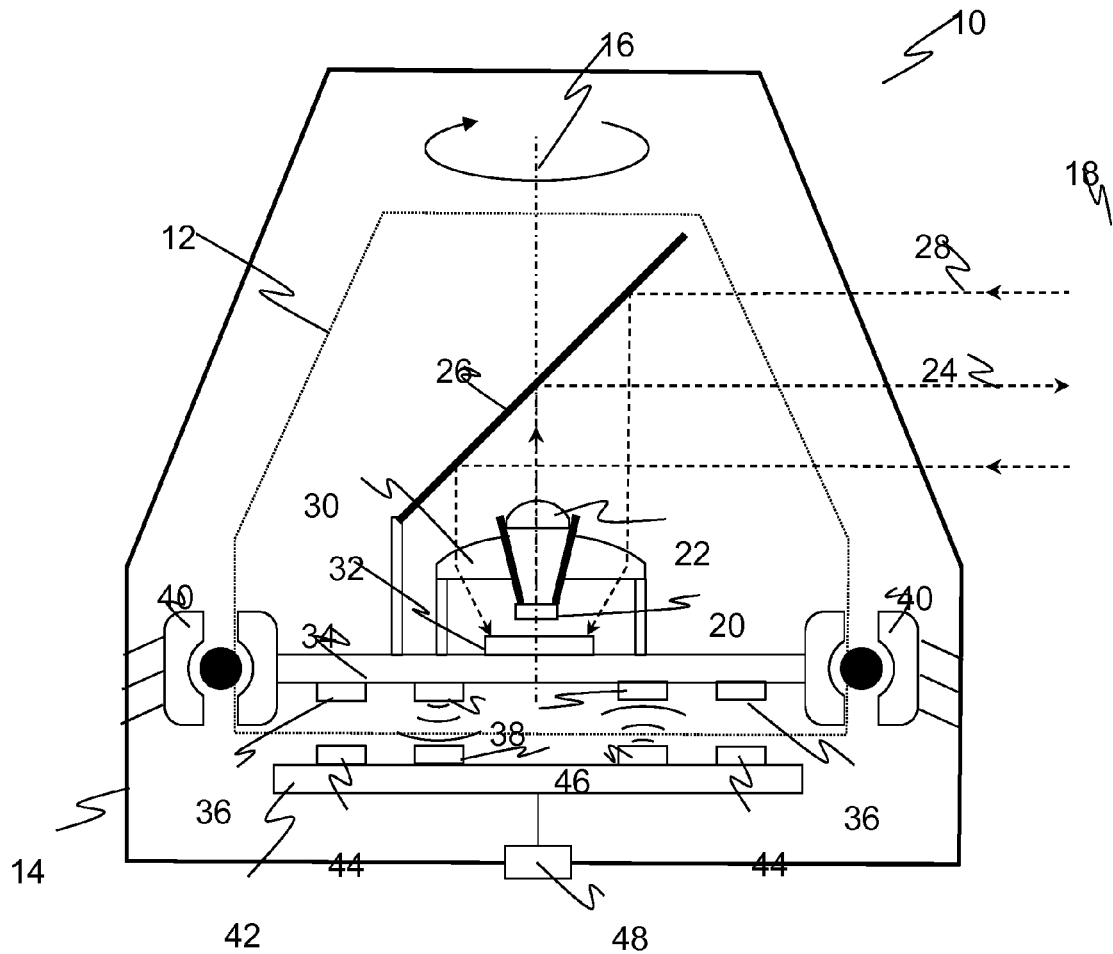

| | | | |
|---|---|---|---|
| EP | 2237064 | B1 | 9/2011 |
| EP | 2388619 | A1 | 11/2011 |
| WO | 2013176362 | A1 | 11/2013 |

* cited by examiner

OPTOELECTRONIC SENSOR AND METHOD FOR DETECTING OBJECTS IN A MONITORED ZONE

The invention relates to an optoelectronic sensor and to a method for detecting objects in a monitored zone in accordance with the preamble of claim 1 and claim 11 respectively.

Optoelectronic sensors, and in particular laser scanners, are suitable for distance measurements which require a large horizontal angular range of the measurement system. In a laser scanner, a light beam generated by a laser periodically sweeps over a monitored zone with the aid of a deflection unit. The light is remitted at objects in the monitored zone and is evaluated in the scanner. A conclusion is drawn on the angular location of the object from the angular position of the deflection unit and additionally on the distance of the object from the laser scanner from the time of flight while using the speed of light.

The location of an object in the monitored zone is detected in two-dimensional polar coordinates using the angular data and the distance data. The positions of objects can thus be determined or an object's contour can be determined by a plurality of scans of the same object at different positions. The third spatial coordinate can likewise be detected by a relative movement in the transverse direction, for example by a further degree of freedom of movement of the deflection unit in the laser scanner or in that the object is conveyed relative to the laser scanner. Three-dimensional contours can thus also be measured.

In addition to such measurement applications, laser scanners are also used in safety technology for monitoring a danger source, such as a dangerous machine. Such a safety laser scanner is known from DE 43 40 756 A1. In this process, a protected field is monitored which may not be entered by operators during the operation of the machine. If the laser scanner recognizes an unauthorized intrusion into the protected field, for instance a leg of an operator, it triggers an emergency stop of the machine. Sensors used in safety technology have to work particularly reliably and must therefore satisfy high safety demands, for example the EN13849 standard for safety of machinery and the machinery standard EN1496 for electrosensitive protective equipment (ESPE).

The sampling of the monitored plane in a laser scanner is typically achieved in that the transmitted beam is incident onto a rotating mirror. The light transmitters, light receivers and associated electronics and optics are fixedly installed in the device and do not also execute the rotational movement. Very high demands result on the alignment of the light transmitters and light receivers due to the mirror. Deviations from this produce a twisted monitored plane. In addition, such optics units are large in construction size because a part of the object width always extends over the mirror up to the reception optics into the device. Scattered light effects at the front screen due to the front screen itself or due to its contamination result in an impairment of the sensor function.

It is also known to replace the rotating mirror by a sampling unit which is also moved. For example in DE 197 57 849 B4, the total measurement head with the light transmitter and light receiver rotates. EP 2 388 619 A1 likewise provides a rotatable transmission/reception unit. This sampling unit is supplied with energy from the rotationally fixed zones of the sensor in accordance with the transformation principle, for example.

In the known laser scanners, a rotational movement is generated by a motor at whose shaft the rotating mirror or the sampling unit is fastened. This classical motor design brings about two supports of the shaft, requires construction space and additionally effort in the assembly.

It is therefore the object of the invention to simplify the design of a sensor with a co-moved sampling unit.

This object is satisfied by an optoelectronic sensor and by a method for detecting objects in a monitored zone in accordance with claim 1 and claim 11 respectively. In this respect, the sensor is designed in two parts with a base unit and a sampling unit. The sampling unit is set into a rotational movement relative to the base unit to sample the monitored zone periodically by a light beam whose echoes from the monitored zone are evaluated. The base unit remains stationary and comprises all further idle elements of the sensor, for example a housing. In this respect, stationary or idle relates to a customary reference system of the sensor which can nevertheless be moved in total, for example in mobile applications at a vehicle which in this case forms the reference system called stationary here. The invention then starts from the basic idea of setting the sampling unit into rotation via a first circuit board of the sampling unit. For this purpose, the first circuit board is rotatably supported at its outer periphery in a bearing of the base unit.

The invention has the advantage that there is only one bearing and not, as conventionally, two supports of a shaft, in the motor, on the one hand, and for the coupling between the shaft and the sampling unit, on the other hand. The support at the outer periphery largely suppresses disadvantageous effects of bearing play due to the large bearing diameter. All forces which arise can be taken up without problem by the bearing. The sensor with its simple design of the high housing integration is particularly small in construction size and is inexpensive, and the first circuit board can be used over its full area because no part of its surface is required for the coupling to a shaft.

The first circuit board is preferably circular. This geometry is particularly suitable for a rotational movement and an outer support.

The bearing is preferably a sleeve bearing. The first circuit board, which should be circular in this case, is thus supported in the bearing over its total periphery. A simple sleeve bearing without special demands on its quality is sufficient for this purpose. The forces which arise are nevertheless taken up and distributed well so that the rotation becomes stable and uniform. A thin sleeve bearing is preferred due to its low weight and its construction size.

The first circuit board preferably forms a carrier for the sampling unit. The sampling unit can form a fully adequate co-rotating optics head, for example with a transmitter, receiver, associated optics and a tube for the optical channel separation between the transmission and reception path. These elements are supported by the first circuit board so that the coupling between the base unit and the sampling unit is provided solely by the outwardly supported first circuit board.

The light transmitter and light receiver are preferably arranged on the first circuit board. The first circuit board therefore supports the light transmitter and the light transmitter not only mechanically, but these elements are directly mounted on the first circuit board. In addition, the first circuit board can comprise at least some of the transmission and reception electronics, for example a transmitter driver and an amplifier, optionally also further control and evaluation elements. It is additionally conceivable to provide at least one further circuit board in the sampling unit, with the named elements then being distributed over the circuit boards.

The first circuit board preferably has an interface unit for the contactless transfer of energy and/or for the exchange of data between the base unit and the sampling unit. The first circuit board thus also forms a wireless interface via which the sample unit is supplied or controlled and whose data are read out.

The first circuit board preferably forms the rotor of a drive for the rotational movement of the sampling unit with respect to the base unit. The corresponding motor windings or magnets are integrated on the first circuit board for this purpose. The first circuit board thus itself becomes part of the drive. There is no longer a separate motor; the first circuit board also satisfies this function.

The base unit preferably has a second circuit board which forms the stator of the drive. The required motor windings or magnets are again integrated on the second circuit board for this purpose. The motor becomes extremely compact and flat in this manner.

The base unit preferably has a second circuit board having an interface unit for the contactless supply of the sampling unit with energy and/or for the exchange of data. In this respect, it is even more preferably the same circuit board as that which forms the stator of the drive. This second circuit board then has additional functions as a wireless interface to provide energy for the sampling unit, to control it or to read out data. The drive thus itself becomes an integrated additional function and does not require any exclusive components. In addition, the second circuit board can comprise a control and evaluation unit. Such a particularly compact sensor then only comprises the two circuit boards and, optionally, an optics in the sampling unit as well as possibly some indispensable additional electronic elements in the base unit. In general, the electronic functions, in particular the control and evaluation unit, but also almost any desired functions, can be distributed over the first circuit board, the second circuit board and further circuit boards in the sampling unit and/or base unit.

The method in accordance with the invention can be designed in a similar manner by further features and shows similar advantages in this respect. Such further features are described in an exemplary, but not exclusive manner in the dependent claims following the independent claims.

Figure 2:
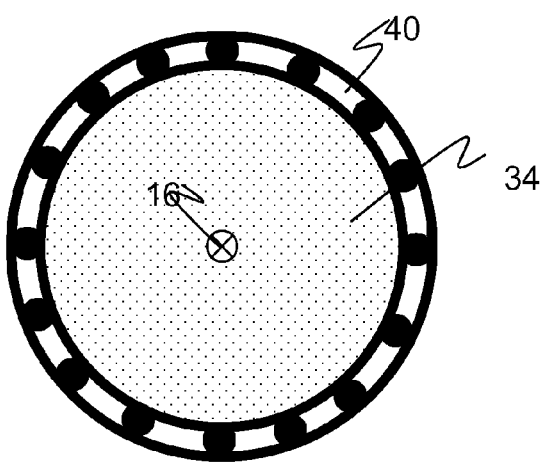
Figure 3:
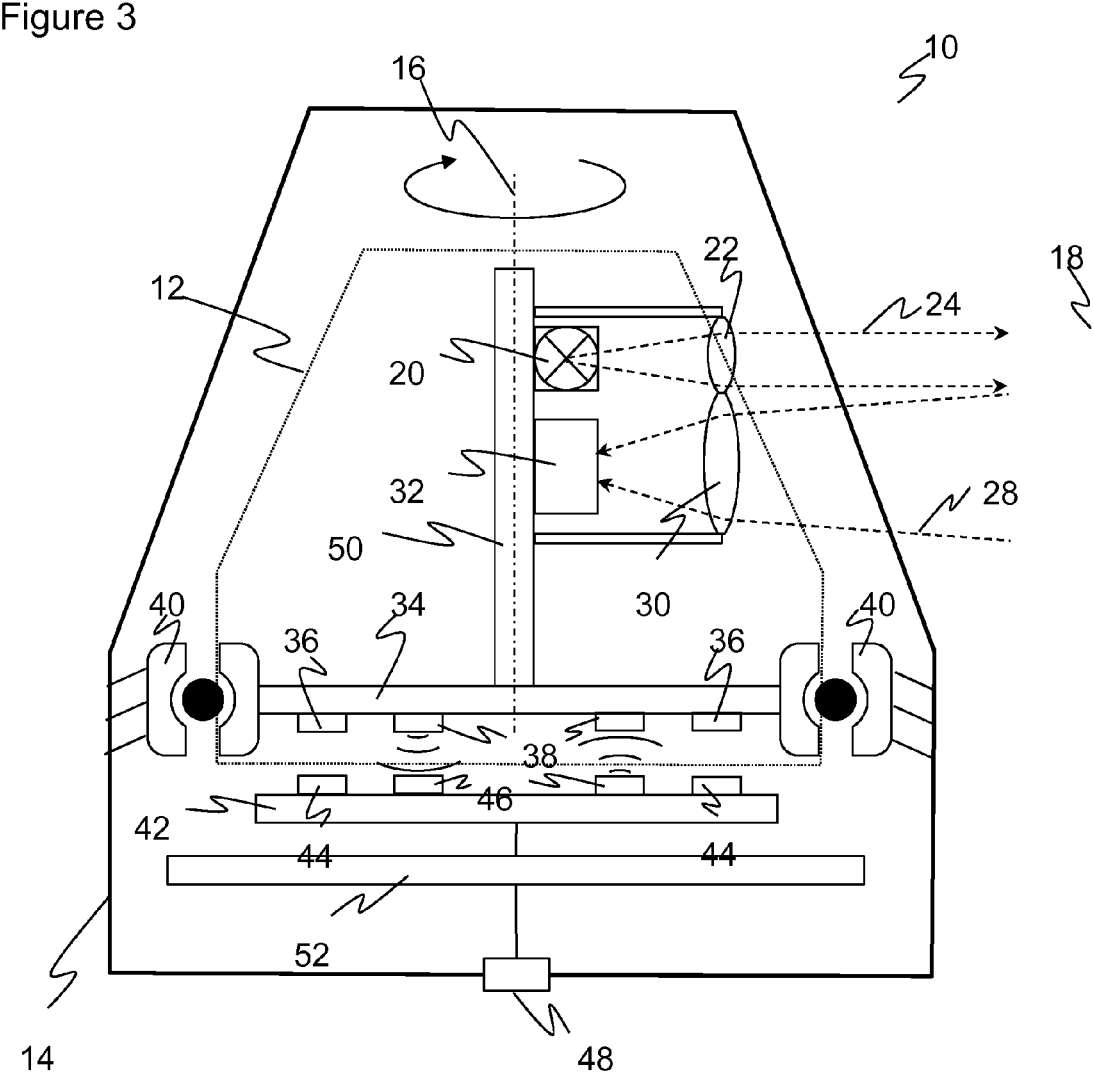

The invention will also be explained in the following with respect to further advantages and features with reference to the enclosed drawing and to embodiments. The Figures of the drawing show in:

FIG. 1 a schematic sectional representation through an optoelectronic sensor;

FIG. 2 a plan view of a rotating circuit board and its support at the outer periphery; and FIG. 3 a schematic sectional representation through a further embodiment of an optoelectronic sensor.

FIG. 1 shows a schematic sectional representation through an optoelectronic sensor 10 in an embodiment as a laser scanner. Various other arrangements of the individual elements of an optoelectronic sensor for detecting objects are conceivable and are covered by the invention. There are in particular a plurality of known variants of laser scanners from which laser scanners in accordance with the invention can arise by respective corresponding modification. The representation should therefore only be understood by way of example.

The sensor 10 in a rough distribution comprise a movable sampling unit 12 and a base unit 14. The dashed line for delineating the sampling unit 12 in FIG. 1 is only an imaginary line and not a separate housing of the sampling unit 12. This would admittedly also be conceivable and covered by the invention, but is not necessary.

The sampling unit 12 is the optical measurement head, whereas further elements such as a supply, evaluation electronics, terminals and the like are accommodated in the base unit 14. In operation, the sampling unit 12 is set into a rotational movement about an axis of rotation 16 with respect to the base unit 14 in order thus to periodically sample a monitored zone 18.

In the sampling unit 12, a light transmitter 20 generates a transmitted light beam 24 with the aid of a transmission optics 24, the transmitted light beam being deflected via a mirror 26 and being transmitted into the monitored zone 18. If the transmitted light beam 24 is incident onto an object in the monitored zone 18, a corresponding light beam returns to the sensor 10 as remitted light 28. The remitted light 28 is again deflected by the mirror 26, is guided by a reception electronics 30 onto a light receiver 32 and is converted there into an electrical received signal.

The light transmitter 20 and light receiver 32 are arranged on a first circuit board 34 orientated perpendicular to the axis of rotation 16. The first circuit board can additionally comprise at least parts of a control and evaluation unit, not shown explicitly, by which the transmitted light beam 24 is generated and the received signal is evaluated.

The first circuit board has motor windings 36, only shown very schematically, or magnets on a rear side remote from the light transmitter 20 and the light receiver 32 or in inner layers. Offset to this, a wireless interface unit 38 is provided which takes energy capacitively, inductively or in accordance with any other technique known per se contactlessly from the base unit 14 or exchanges data contactlessly with the base unit 14. The specific embodiment of the motor windings 36 and of the interface unit 38 will not be looked at in any more detail here and accordingly no restrictions of the arrangement in this respect should also be deduced from the drawing representation in FIG. 1.

The first circuit board 34 is supported at its outer periphery in the inner sleeve of a sleeve bearing 40. The outer sleeve of the sleeve bearing 40 is fixed in the base unit 14. The first circuit board 34 can thereby rotate with respect to the base unit 14 in the sleeve bearing 40. FIG. 2 shows in a supplementary manner hereto a plan view of the first circuit board 34 in the sleeve bearing 40. In this manner, the first circuit board 34 forms a carrier of the sampling unit 12 since it is the first circuit board 34 which is rotationally movably supported and the transmission optics 22, the reception optics 30 and the mirror 26 are mechanically supported on the first circuit board 34.

A second circuit board 42 is located in the base unit 14 and has separate motor windings 44 or magnets corresponding to the motor windings 36. The two circuit boards 34, 42 themselves thus form the drive, with the first circuit board 34 in the sampling unit 12 adopting the role of the rotor and the second circuit board 42 in the base unit 14 adopting the role of the stator. An additional separate drive is thus no longer necessary.

The second circuit board 42 additionally comprises a wireless interface unit 46 which, together with the wireless interface unit 38 of the first circuit board, forms a supply unit for the contactless supply of the sampling unit 12 with energy and/or forms a preferably bidirectional contactless data interface.

Finally, further electronics are also located on the second circuit board 42 which are not shown and which form the control and evaluation unit of the sensor 10 in cooperation with corresponding electronics of the first circuit board 34. The division between the sampling unit 12 and the base unit 14 can in this respect vary practically as desired in different embodiments of the invention. This division is preferably made such that, on the one hand, the sampling unit 12 requires less energy and, on the other hand, a small bandwidth is sufficient for the wireless data transmission.

In operation, the control and evaluation unit activates the light transmitter 20 and receives the received signal of the light receiver 32 for a further evaluation. It additionally controls the rotational movement via the motor windings 36, 44 and receives the signal of an angular measurement unit which is not shown, which is generally known from laser scanners and which determines the respective angular position of the sampling unit 12. The distance from a sampled object is measured for the evaluation, preferably using a time of flight process. The transmitted light of the light transmitter 20 is modulated in a phase-based system for this purpose and a phase relation to the received signal of the light receiver 32 is evaluated. Alternatively, in a pulse-based system, short light pulses are transmitted as transmitted light at a transmission point in time and their reception point in time is determined from the received signal. In this respect, both individual pulse processes are conceivable which respectively determine a distance from a single transmitted pulse and pulse averaging processes are conceivable in which the received signal is collected and statistically evaluated after a plurality of successively following transmitted pulses. Since the respective angular position at which the transmitted light beam 24 was respectively transmitted is also known by the angular measurement unit, two-dimensional polar coordinates of all object points are available in a scanned plane via the angle and the distance after each rotation of the sampling unit 12. A three-dimensional monitored zone 18 could also be detected by an additional tilting of the sampling unit 12.

The object positions or object contours are thus known and can be output via a sensor interface 48. The sensor interface 48 or a further terminal, not shown, conversely serve as a parameterization interface. In applications in safety technology, protected fields which can be configured in the monitored zone 18 are monitored for unauthorized intrusions and thereupon a safety-directed switch-off signal is optionally output via the then safely configured interface 48 (OSSD, output signal switching device).

FIG. 3 shows a schematic sectional representation through a further embodiment of an optoelectronic sensor 10. In this, the same reference numerals designate the same features as in FIG. 1. The sensor 10 differs from that in accordance with FIG. 1 by the optical design in the sampling unit 12 and by additional circuit boards 50, 52. The latter should only serve as an example for the additional circuit boards which have been mentioned several times and which complement the first circuit board 34 or the second circuit board 42.

The optical axes of the light transmitters and light receivers 32 in this embodiment are orientated perpendicular to the axis of rotation 16, that it tilted by 90° with respect to FIG. 1. No mirror 26 is thereby required. An additional circuit board 50 is provided for this purpose which lies on the axis of rotation 16 and which is electrically connected to the first circuit board 34. To show a further optical variation possibility, the light transmitter 20 and the light receiver 32 are here shown beside one another instead of coaxially as in FIG. 1 and utilize a double lens as transmission optics 22 and reception optics 30.

A further circuit board 52 which is electrically connected to the second circuit board 42 is likewise located in the base unit 14. This circuit board 52 functionally serves as an extension of the second circuit board 42, provided that the latter does not provided sufficient space and capacity. Depending on the embodiment, the further circuit board 52 can be dispensed with or, conversely, even more circuit boards can be provided.

The light transmitter 22 can in all embodiments be respectively designed as a simple light source with a wavelength, for example, in the visible spectrum, the ultraviolet spectrum or in the infrared spectrum, for instance in the form of a semiconductor diode; but in other embodiments also, for example, as a linear or matrix-like arrangement of numerous light sources. The light receiver 32 can correspondingly be a simple reception surface, for instance of a photodiode or it can be, for example, be a linear or matrix-like arrangement of light reception elements such as a CCD chip or a CMOS chip. Not only a single sampling beam thus arises, but also a corresponding plurality for taking two-dimensional image data or three-dimensional image data with the aid of a time of flight process. In principle, practically any desired sensor units can rotate in the sampling unit 12 and thus detect the monitored zone 18, for example also a plurality of sensor units at different angular positions which complement one another with the same or different physical measurement principles.

The conventional, actual moto shaft with its two supports can be completely dispensed with by the support of the first circuit board 34 at its outer periphery in accordance with the invention. Instead the first circuit board 34 with its motor windings 36 attached thereto and the elements of the sampling unit 12 carried by the first circuit board 34 is set into rotation directly. The sleeve bearing 40 forms a single large bearing around the first circuit board 34. Effects due to bearing play are subordinated due to the large bearing diameter and very favorable bearings can be made use of, for example thin sleeve bearings of comparatively low quality. Such a bearing can very easily take up all forces which arise.

The invention claimed is:

1. An optoelectronic sensor for detecting objects in a monitored zone, the optoelectronic sensor comprising
    a light transmitter for transmitting a transmitted light beam,
    a base unit;
    a sampling unit rotatable with respect to the base unit for the periodic sampling of the monitored zone by the transmitted light beam;
    a first circuit board;
    a light receiver for generating a received signal from the light remitted by objects in the monitored zone; and
    an evaluation unit for detecting information on objects in the monitored zone with reference to the received signal,
    wherein the base unit has a bearing in which the first circuit board is rotatably supported at its outer periphery with respect to the base unit, and
    wherein the first circuit board forms the rotor of a drive for the rotational movement of the sampling unit with respect to the base unit.

2. The optoelectronic sensor in accordance with claim 1, wherein the optoelectronic sensor is a laser scanner.

3. The optoelectronic sensor in accordance with claim 1, wherein the first circuit board forms a carrier for the sampling unit.

4. The optoelectronic sensor in accordance with claim 1, wherein the light transmitter and the light receiver are arranged on the first circuit board.

5. The optoelectronic sensor in accordance with claim 1, wherein the first circuit board has an interface unit for the contactless transfer of energy and/or for the exchange of data between the base unit and the sampling unit.

6. The optoelectronic sensor in accordance with claim 1, wherein the base unit has a second circuit board which forms the stator of the drive.

7. The optoelectronic sensor in accordance with claim 1, wherein the base unit has a second circuit board having an interface unit for the contactless supply of the sampling unit with energy and/or for the exchange of data.

8. An optoelectronic sensor for detecting objects in a monitored zone, the optoelectronic sensor comprising
   a light transmitter for transmitting a transmitted light beam,
   a base unit;
   a sampling unit rotatable with respect to the base unit for the periodic sampling of the monitored zone by the transmitted light beam;
   a first circuit board;
   a light receiver for generating a received signal from the light remitted by objects in the monitored zone; and
   an evaluation unit for detecting information on objects in the monitored zone with reference to the received signal,
   wherein the base unit has a bearing in which the first circuit board is rotatably supported at its outer periphery with respect to the base unit,
   wherein the circuitry board is circular, and
   wherein the bearing is a sleeve bearing.

9. A method of detecting objects in a monitored zone, the method comprising the steps of:
   transmitting a transmitted light beam,
   periodically sampling the monitored zone by a rotational movement of a sampling unit with respect to a base unit,
   generating a received signal from the light remitted by objects in the monitored zone, and
   evaluating the received signal for detecting information on objects in the monitored zone,
   wherein the rotational movement takes place by supporting the outer periphery of a first circuit board of the sampling unit in a bearing surrounding the first circuit board, and
   wherein the first circuit board forms the rotor of a drive for the rotational movement of the sampling unit with respect to the base unit.

* * * * *